July 7, 1925.

J. PLOCEK

MOTOR VEHICLE

Filed Feb. 19, 1925

1,544,775

2 Sheets-Sheet 1

Inventor
J. Plocek
By Marks & Clerk
Attys.

July 7, 1925.

J. PLOCEK

MOTOR VEHICLE

Filed Feb. 19, 1925

1,544,775

2 Sheets-Sheet 2

Inventor
J. Plocek
By Marks & Clerk

Patented July 7, 1925.

1,544,775

UNITED STATES PATENT OFFICE.

JOSEF PLOCEK, OF PILSEN, CZECHOSLOVAKIA.

MOTOR VEHICLE.

Application filed February 19, 1925. Serial No. 10,423.

*To all whom it may concern:*

Be it known that I, JOSEF PLOCEK, of Czechoslovakian nationality, and residing at Pilsen, Korandova ul. No. 2, Czechoslovakia, have invented certain new and useful Improvements in Motor Vehicles, of which the following is a specification.

In motor vehicles intended for travelling at high speed in either direction the problem of steering and of rapidly altering the direction of motion has hitherto not been solved.

The subject of the present invention is a motor vehicle with two steering axles, in which each axle is steered by independent steering means, one or other of the two steering gears being locked by a locking mechanism according to the direction of travel, the arrangement being such that the wheels which are not being used for steering are held so as to be incapable of lateral movement and that at the same time a set of gear teeth in the gear box are actuated by the locking mechanism in such a manner that with the reversal of the steering gear the direction of travel of the vehicle is also reversed.

The accompanying drawings give a diagrammatic representation of the invention, the steering axles being shown turned through 90° with respect to the steering gear, so as to give a clear picture of the mode of operation.

Figure 1:
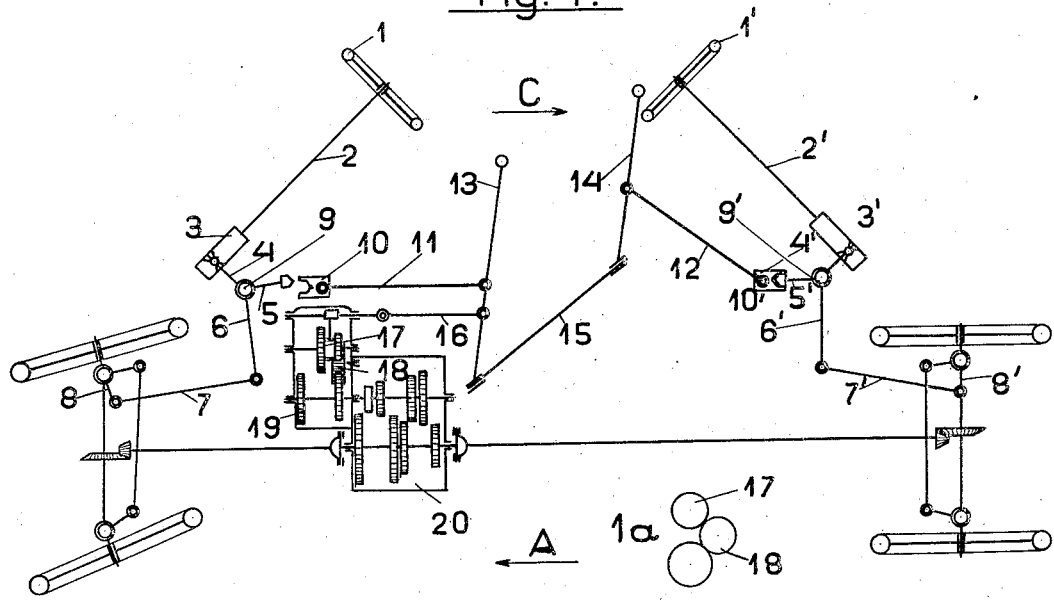
Figure 2:
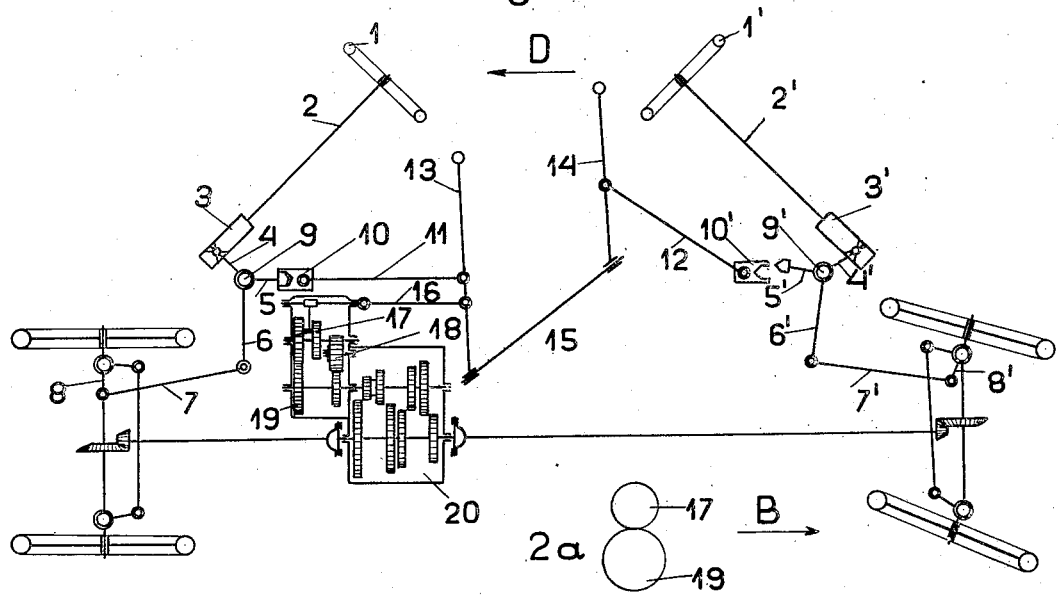
Figure 3:
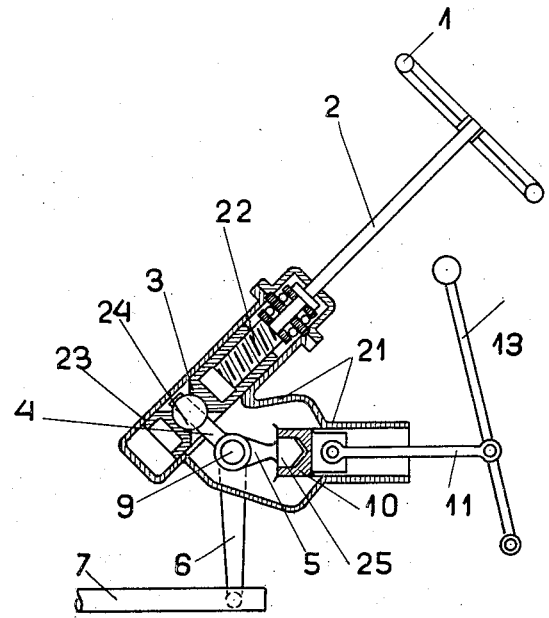
Figure 4:
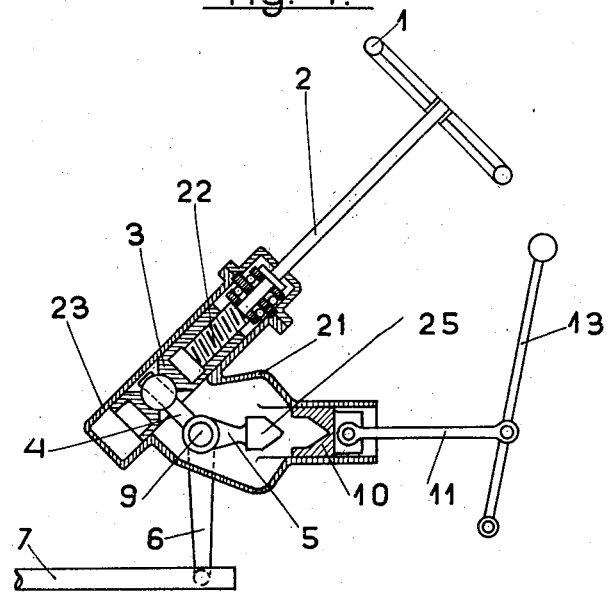

Figure 1 shows a motor vehicle for travelling in the direction indicated by the arrow A and Figure 1ᵃ shows diagrammatically the relative position of the gear wheels in the gear box for a direction of travel as in Figure 1. Figure 2 shows the same motor vehicle with the steering mechanism set for travelling in the direction indicated by the arrow B and Figure 2ᵃ shows diagrammatically the corresponding setting of the gear wheels in the gear box. Figures 3 and 4 are details of the locking mechanism of the steering gear.

In the figures the same parts are given the same reference numbers, 1, 1′ being the steering wheels; 2, 2′ the steering spindles; 3, 3′ the nut of the steering screw; 4, 5, 6, 4′, 5′, 6′ a three-armed lever capable of turning round the fixed pin 9, 9′; 7, 7′ a connecting bar which connects the lever arm 5, 5′ to the steering stub shaft 8, 8′; 10, 10′ locking blocks, which lock the lever arm 5, 5′, when in the locking position. The locking block 10 is connected by means of a connecting bar 11 to the hand lever 13 and the locking block 10′ by means of a connecting bar 12 to the hand lever 14, both hand wheels 13 and 14 being also interconnected by a connecting bar 15. The hand lever 13 is in addition connected by means of a connecting bar 16 to a pair of gear wheels 17 in the gear box 20.

The steering arrangement operates in the following manner: When the vehicle is to travel in the direction indicated by the arrow A (Fig. 1), the lever 13 is thrown back in the direction indicated by the arrow C and the connecting bars 11 and 16 will displace the locking block 10 and the pair of gear wheels 17. Simultaneously with the throwing back of the lever 13 the lever 14 will be thrown back, as the two levers are positively connected together by the connecting bar 15, and the locking block 10′ will be forced against the lever 5′ of the three-armed lever 4′, 5′, 6′, the lever 5′ having of course to be brought into such a position that the locking block 10′ can be pushed aside. With the hand levers in this position the steering wheel 1 is free to turn and is the front steering wheel for this direction of travel. One gear wheel of the pair of gear wheels 17 meshes with the gear wheel 18 on the countershaft and consequently the vehicle will automatically be caused to move in the direction indicated by the arrow A when the steering gear is reversed.

If the direction of travel of the vehicle is to be suddenly reversed, for instance when the vehicle is in a narrow lane not allowing of the vehicle being turned, the wheels which were up to then turned laterally by the steering gear by turning the hand wheel 1, are brought into the normal central position, as shown in Figure 2, and consequently also the arm 5 of the three-armed lever 4, 5, 6. The lever 13 is thereupon thrown back into the direction indicated by the arrow D and the steering gear 1—9 locked by the locking block 10 being slid on to the lever arm 5. The movement of the lever 13 will at the same time have displaced the pair of gear wheels 17 in the gear box, so that one wheel of the pair will mesh with the gear wheel 19, thus causing the direction of travel of the vehicle to be changed to that indicated by the arrow B. By the lever 13 being thrown back the lever 14 is also positively thrown back and the connecting bar 12 attached to the latter lever will draw back the locking block 10′, thus releasing the steering gear 1′—9′.

In Figures 3 and 4 the locking mechanism is shown in detail. The nut 3 of the steering screw is slidable in a casing 23 and is slid therein by means of the steering screw 22, which is turned by means of the spindle 2 of the steering wheel 1. In the nut 3 of the steering screw there is a ball and socket joint 24, which is in operative connection with the arm 4 of the three-armed lever 4, 5, 6. The three-armed lever is adapted to turn on the fixed pin 9. The arm 6 of the three-armed lever transmits its motion by means of the connecting bar 7 to the steering stub shaft 8. On the end of the third arm 5 of the three-armed lever there is a helmet shaped piece 25, on to which the locking block 10 is adapted to be pushed, which is guided in the casing 21 forming one piece with the casing 23 or fixed to the same.

The piece 25 on the locking lever is made wedge-shaped and the locking block 10 has a wedge-shaped recess. By the two parts having this shape, the block can, even if the steering gear has not been brought into its central position, be slid on to the piece 25 by means of the hand lever 13, whereby the steering gear and with it the front wheels are brought into the central position. In Figure 3 the steering gear is shown in the locked state and in Figure 4 in the unsecured state. Obviously the locking means may be modified in many ways and the levers 13 and 14 might be united into a single lever.

What I claim is:—

1. A motor vehicle capable of travelling in either direction, comprising in combination with a main driving gear an additional driving gear, two steering axles, separate steering means for the steering axles, means for simultaneously locking the steering means of one steering axle and unlocking those of the other steering axle and means for operating the locking means and for simultaneously therewith displacing the additional driving gear, which causes the direction of travel to be reversed, as set forth.

2. A motor vehicle capable of travelling in either direction, comprising in combination with a main driving gear an additional driving gear, two steering axles, separate steering means for the steering axles, means for simultaneously locking the steering means of one steering axle and unlocking those of the other steering axle, a hand lever for operating the locking means and for simultaneously therewith displacing the additional driving gear, which causes the direction of travel to be reversed, and a shaft, on which the lever is mounted, as set forth.

3. A motor vehicle capable of travelling in either direction, as claimed in claim 2, and in which the means for locking the steering means are constituted by two locking members, one of which is permanently connected to the hand lever, whilst the other locking member is connected to the steering means in such a manner as to be capable of following the movements of the steering means, when the two locking members are not operatively connected together and of locking the said steering means, when the two locking members are in operative connection, as and for the purpose set forth.

4. A motor vehicle capable of travelling in either direction, as claimed in claim 2, and in which the means for locking the steering means are constituted by two locking members, one of which is permanently connected to the hand lever, whilst the other locking member is connected to the steering means in such a manner as to be capable of following the movements of the steering means, when the two locking members are not operatively connected together and of locking the said steering means, when the two locking members are in operative connection, the two locking members being so shaped that, even when out of alinement with each other, they can be brought into operative connection with each other, whereby the steering means and the steering axles are brought into their central position, as set forth.

In testimony whereof I have signed my name to this specification.

JOSEF PLOCEK.

Witnesses:
 JUSTEN ROHAE,
 R. WANKEE.